Feb. 14, 1928.

H. W. SHAW

LEVEL

Filed Nov. 29, 1926

1,659,446

H. W. Shaw
Inventor

By C. A. Snow & Co.
Attorneys.

Patented Feb. 14, 1928.

1,659,446

UNITED STATES PATENT OFFICE.

HENRY W. SHAW, OF CHATTANOOGA, TENNESSEE.

LEVEL.

Application filed November 29, 1926. Serial No. 151,471.

This invention aims to provide a novel pendulum level, so constructed that it will withstand severe use and be adaptable to various kinds of work.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
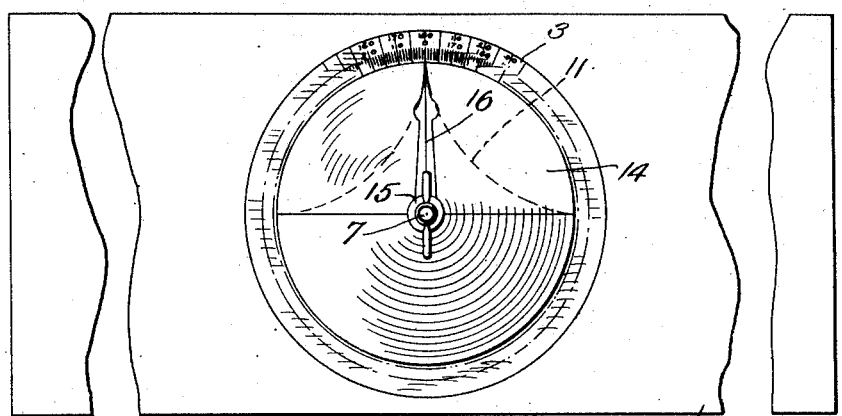
Figure 1 shows in front elevation, a device constructed in accordance with the invention, parts being broken away.

The device forming the subject matter of this application includes a stock 1 provided with a recess 2 which may be of circular form, the recess 2 extending into the stock from one side thereof. The numeral 3 marks a graduated ring-dial which is secured to the stock 1 about the recess 2, the dial 3 overhanging the recess 2, as clearly shown in Figure 2 of the drawings.

A ball bearing 4 is secured at 5 to the stock 1 at the base of the recess 2. A shaft 6 is mounted to rotate in the ball bearing 4, and is held therein, the shaft 6 having a reduced end 7 forming a shoulder 8.

An approximately semi-circular pendulum plate 9 is mounted on the reduced end 7 of the shaft 6 and abuts against the shoulder 8. A curved weight 10 is secured to the pendulum plate 9. The pendulum plate 9 has a pointed index 11 located in the same plane with the ring-dial 3 and adapted to cooperate with the graduations of the ring-dial.

Figure 2:
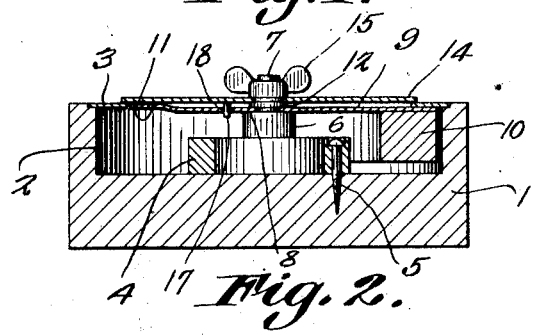
Figure 2 is a transverse section.
Figure 3:
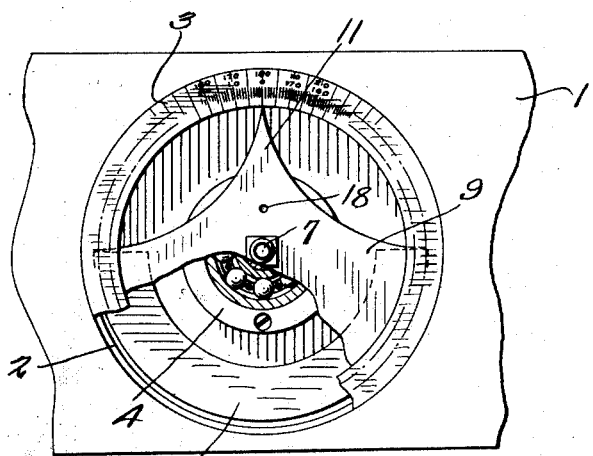
Figure 3 is an elevation wherein portions of the dial and the pendulum plate have been removed.

A washer 12 is mounted on the end 7 of the shaft 6 and abuts against the pendulum plate 9. A circular cover 14, preferably made of metal, is mounted on the end 7 of the shaft 6 and is held against the washer 12 by means of a nut 15 threaded on the end 7 of the shaft 6. The cover plate 14 is of sufficient size so that it overlaps the ring-dial 3, as shown in Figure 2. The cover 14 is provided on its outer surface with an index mark 16 which coincides with the pointed index 11 on the pendulum plate 9. In order to hold the index mark 16 of the cover 14 alined with the pointed index 11 of the pendulum plate 9, interengaging elements are provided on the cover plate 14 and on the pendulum plate 9. These interengaging elements may be in the form of a pin 17 on the cover plate 14, the pin being received removably in an opening 18 which is formed in the pendulum plate 9.

When the parts are assembled as shown in Figure 1 of the drawings, the weight 10 causes the pendulum plate 9 to swing, the plate 9 rotating the shaft 6 in the ball bearing 4, and the index mark 16 on the cover plate 14 cooperating with the graduations of the ring-dial 3, the cover plate 14 and the pendulum plate 9 being held together, not only by the clamping action of the wing nut 15, but, as well, by reason of the fact that the pin 17 on the plate 14 is received in the opening 18 of the plate 9.

The cover plate 14 is used where there is plenty of light, and when conditions are such that it is desired to prevent sediment, dust, dirt and the like from entering the recess 2. If, however, the device is used in a dark place, where it will be somewhat difficult to see the index mark 16, then, by loosening the wing nut 15, the cover plate 14 may be removed, and the pointed part 11 of the pendulum plate 9 may be relied upon, in connection with the graduated ring-dial 3, to give the desired information.

The general construction of the device is such that if ease of reading is a prime requisite, the plate 14 may be removed, and the part 11 relied upon to give the angle; whereas, if it is desired to protect the mechanism from dirt, or against rough usage, then the plate 14 may be mounted in place and its index mark 16 be used, in conjunction with the ring-dial 3.

What is claimed is:—

In a device of the class described, a stock provided with a recess, a graduated ring-dial secured to the stock about the recess, the dial overhanging the recess, a bearing secured to the stock at the base of the recess, a shaft mounted to rotate in the bearing, the shaft having a reduced end forming a shoulder, an approximately semi-circular pendulum plate mounted on the reduced end of the shaft and abutting against the shoulder, a weight secured to the pendulum plate, the pendulum plate having a pointed index located in the same plane with the ring-dial and adapted to cooperate with the graduations of the ring-dial, a spacer mounted on the end of the shaft and abutting against the pendulum plate, a cover mounted on the end of the shaft and means for holding the cover against the spacer, the cover plate being of sufficient size so that it overlaps the ring-dial, the cover plate being provided on its outer surface with an index mark which coincides with the pointed index on the pendulum plate, and interengaging elements on the cover plate and on the pendulum plate.

In testimony that I claim the foregoing as my own, I have hereto affixed my signature.

HENRY W. SHAW.